Figure 1:
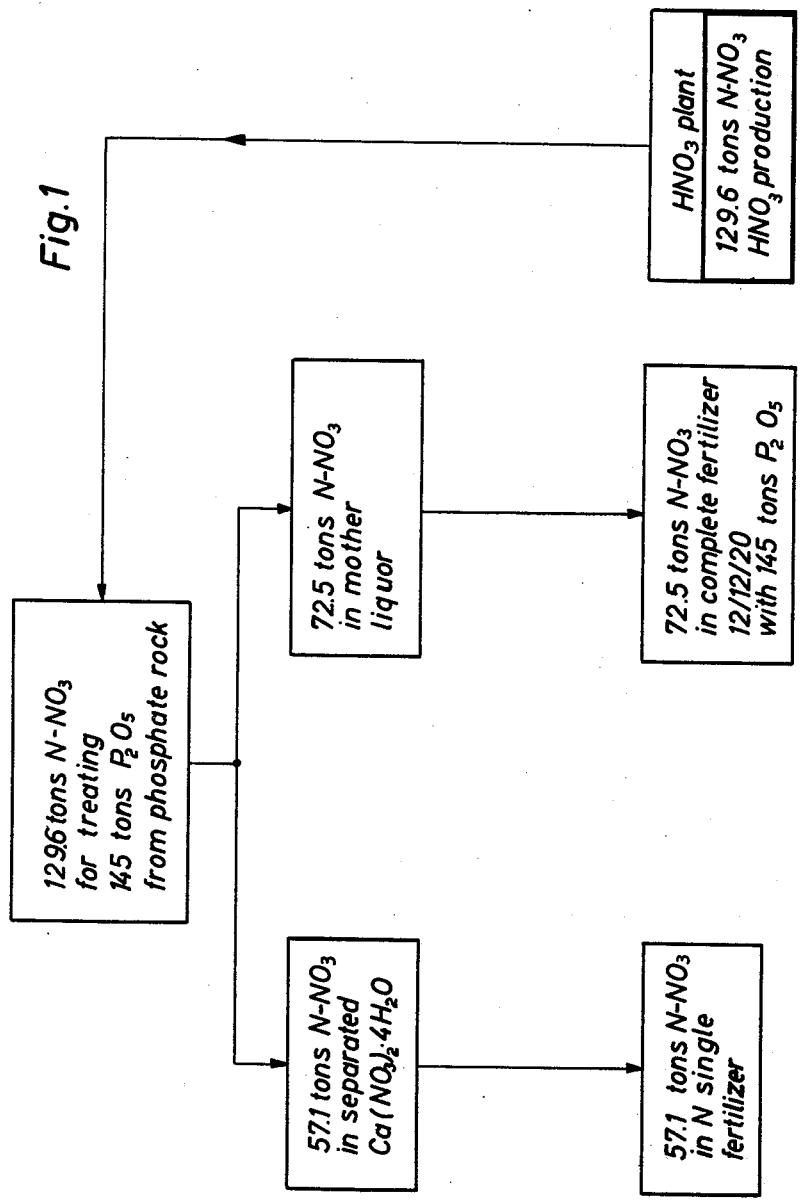

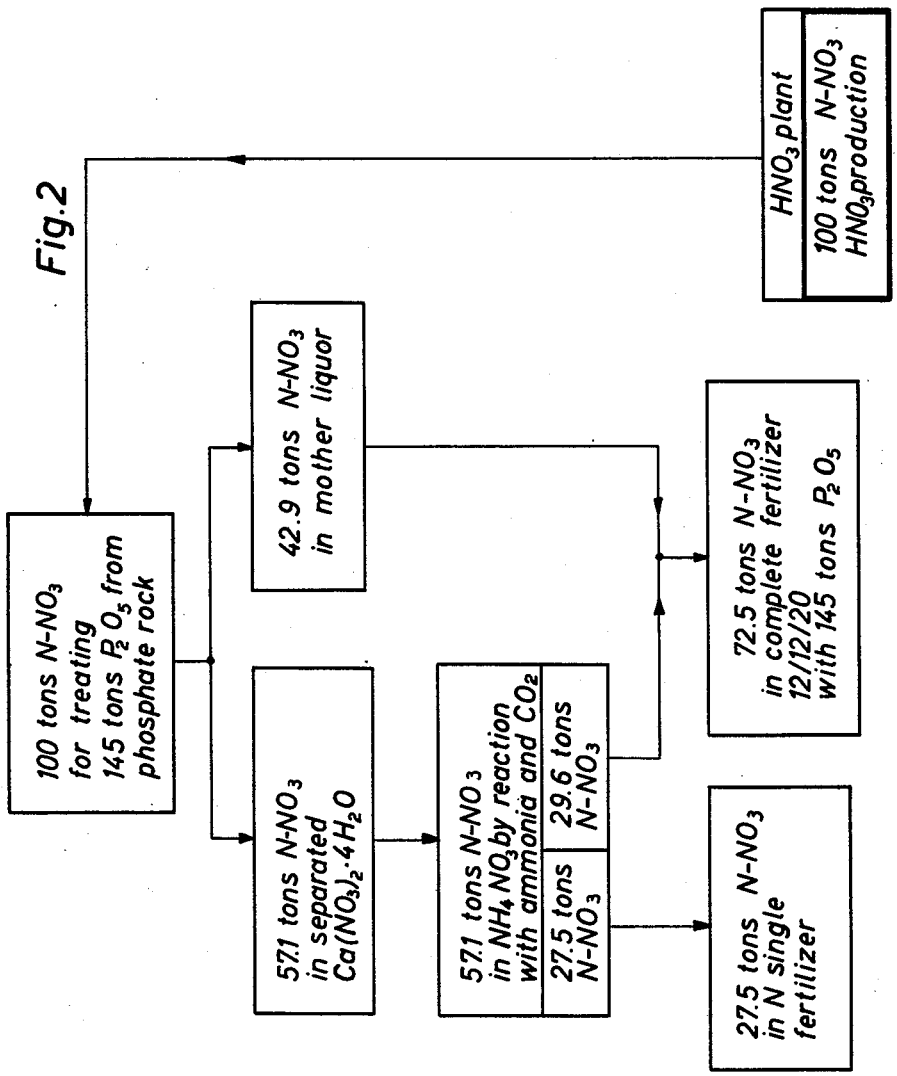

May 12, 1964    K. GEIERSBERGER ETAL    3,132,935
PROCESS FOR THE PRODUCTION OF COMPLEX FERTILIZERS
Filed March 10, 1958      4 Sheets-Sheet 3
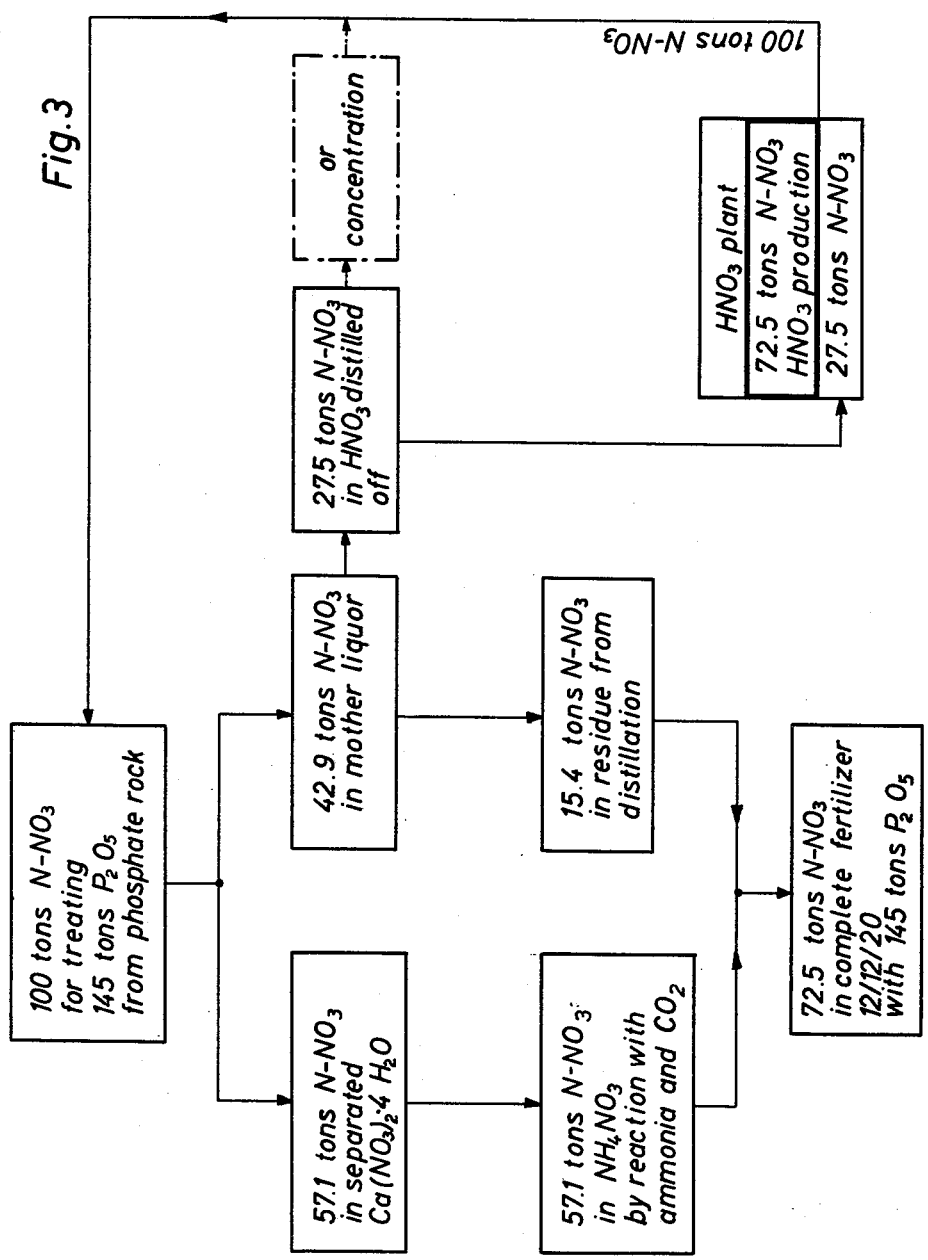
INVENTORS
KARL GEIERSBERGER, HUGO NEES and FRITZ VORSTER
BY
Burgers, Dinklage & Sprung
ATTORNEYS

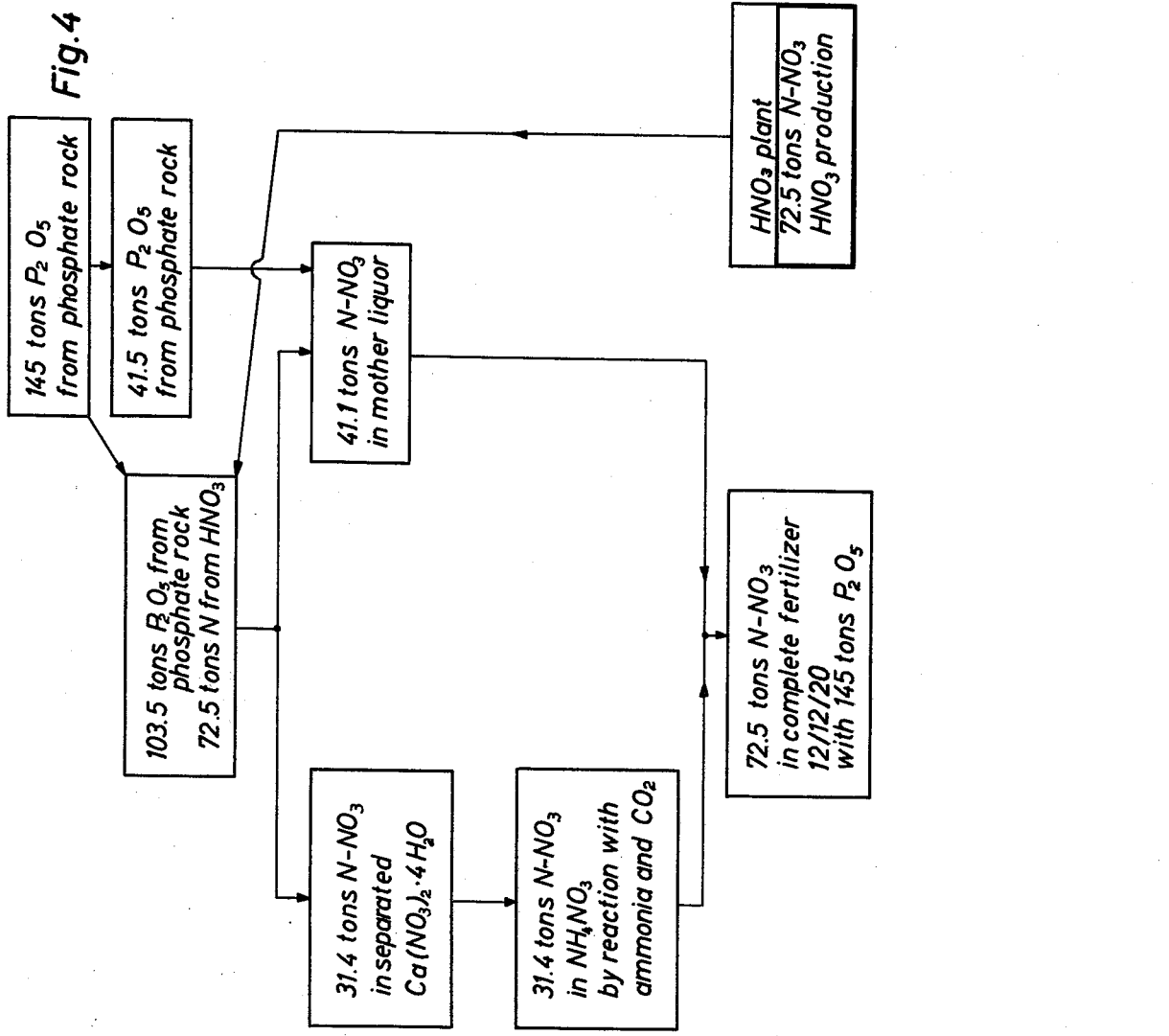

United States Patent Office 3,132,935
Patented May 12, 1964

3,132,935
PROCESS FOR THE PRODUCTION OF COMPLEX FERTILIZERS
Karl Geiersberger, Cologne-Deutz, Hugo Nees, Cologne-Bruck, and Fritz Vorster, Cologne-Marienburg, Germany, assignors to Chemische Fabrik Kalk G.m.b.H., Cologne-Kalk, Germany, a German corporation
Filed Mar. 10, 1958, Ser. No. 720,310
Claims priority, application Germany Mar. 14, 1957
12 Claims. (Cl. 71—39)

This invention relates to a process for the production of complex fertilizers, particularly of such complex fertilizers, the content of total nitrogen of which is equal or nearly equal to that of $P_2O_5$ present in form of phosphates which are completely soluble in ammonium citrate and partially soluble in water.

In a number of known processes which are summarized under the collective name of "Odda processes," phosphate rock is treated with sufficient nitric acid of medium concentration that the total amount of calcium phosphate contained in the phosphate rock is converted to free phosphoric acid and calcium nitrate. Part of the dissolved calcium nitrate is separated in form of calcium nitrate tetrahydrate from the acidulated mixture by cooling the latter. In this manner, the molar ratio of CaO to $P_2O_5$ initially present in the acidulated mixture and having a numerical value of between about 3.4 and 4.0 depending upon the type of phosphate rock used can be reduced to a definite low value, it being possible to adjust the particular amount desired by the particular amount of calcium nitrate tetrahydrate separated.

The Odda mother liquor is subsequently neutralized with ammonia and the finished ammoniation mixture is further processed to complex fertilizers in known manner with the addition of potassium salts.

The maintaining of a definite maximum molar ratio of CaO to $P_2O_5$ in the Odda mother liquor is of substantial importance with regard to its further processing to complex fertilizers. As is known, hygroscopic calcium nitrate must not be contained in the complex fertilizers in order that the same be stable in storage. This is the case if not more than 2 mols of calcium nitrate are contained in the mother liquor per mol of $P_2O_5$ as may be seen from the following simplified ammoniation equation:

$$2H_3PO_4 + 2Ca(NO_3)_2 + 4NH_3 = 2CaHPO_4 + 4NH_4NO_3$$

As was found in practice, as much as 0.3 mol of CaO contained in the mother liquor in form of compounds which are difficult to acidulate, chiefly as calcium fluoride, calcium silicate or calcium sulfate, are generally present in addition to the 2 mols of CaO present in the form of calcium nitrate.

It results from the above statements that the mol ratio of CaO to $P_2O_5$ in the mother liquor should practically not exceed the value of about 2.3 if complex fertilizers are to be obtained which are stable in storage and which contain the total amount of $P_2O_5$ in form of dicalcium phosphate soluble in ammonium citrate. In addition, part of the total amount of $P_2O_5$ may be present in water-soluble form in the complex fertilizer. In the latter case, the mol ratio of CaO to $P_2O_5$ generally falls within the numerical range of from about 2 to 0.5.

In addition to the objects referred to above, it is an object of this invention to provide a process for the production of complex fertilizers in which the mol ratio of CaO to $P_2O_5$ is at a maximum of 2.3 and less.

As is known, there exist still further possibilities permitting the particular mol ratio desired of CaO to $P_2O_5$ in complex fertilizers to be adjusted in a different manner than by the above-mentioned separation of calcium nitrate from the nitric acidulate. Thus, for example, part of the CaO contained in dissolved form in the acidulated mixture is separated in form of $CaSO_4$ by acidulating the phosphate rock with nitric acid together with sulfuric acid or by adding suitable soluble sulfates to the nitric acidulate. However, such a mode of operation has the disadvantage that, in addition to nitric acid, relatively expensive sulfuric acid must be used which, in contrast to nitric acid, is not paid in the final complex fertilizer. Moreover, the precipitated calcium sulfate represents a ballast material which reduces the percentage of basic plant nutrients in the complex fertilizer.

A further possibility of adjusting a particular molar ratio of CaO to $P_2O_5$ consists in acidulating the phosphate rock with nitric acid together with free phosphoric acid or adding suitable soluble phosphates to the nitric acidulate thereby increasing the $P_2O_5$ content with respect to the CaO content in the acidulated mixture. However, such a mode of operation has the disadvantage that the phosphoric acid to be used in addition to nitric acid must first be specially produced in a separate plant with the use of relatively expensive sulfuric acid.

Thus, it is doubtless that the production of complex fertilizers by the Odda process repeatedly referred to above has advantages over the last-mentioned processes in which sulfuric acid and/or phosphoric acid is used in addition to nitric acid. It must also be admitted, however, that besides these advantages there also exist certain disadvantages which chiefly consist in the fact that the calcium nitrate tetrahydrate separated from the mother liquor is as such no marketable product. It must rather be converted in known manner into salable nitrogen-carrying single fertilizers, viz. into calcium nitrate or ammonium nitrate-limestone. In connection herewith, the further disadvantage results that the nitrate nitrogen ($N-NO_3$) contained in single nitrogen fertilizers is naturally not capable of appearing in the complex fertilizers produced. As a result hereof, a nitric acid plant having a disproportionately high capacity, in comparison to the amount of nitrate nitrogen actually contained in the complex fertilizers produced, is required in connection with the conventional Odda process.

It is among the objects of this invention to provide a process for producing complex fertilizers, which process is based on the known Odda process but avoids to a substantial extent or completely the above-mentioned disadvantages of the Odda process. This means that nitrogen-carrying single fertilizers are not obtained at all or in substantially lower amount in case of the process of the invention. In connection herewith, the further disadvantage otherwise involved in the Odda process, i.e., the necessity of operating a nitric acid plant having a disproportionately high capacity, is eliminated. In connection with the process of the invention the nitric acid plant needs to produce at most 1.4 times the amount of $N-NO_3$ actually contained in the complex fertilizers produced. In contrast to this, the corresponding proportion for the conventional Odda process is 1.8 to 2 times said amount.

Other objects and advantages will be apparent from the following detailed description thereof.

The process of this invention may be carried out batchwise or continuously using three embodiments. One of the embodiments which, for simplicity, is hereinafter referred to as embodiment I comprises the following operational steps:

Step 1.—Phosphate rock is treated in known manner with a sufficient amount of nitric acid of medium concentration which is preferably 50 to 60% as is approximately required to convert the calcium phosphate and calcium carbonate contained in the quantity applied of phosphate rock. The quantity of nitric acid is from 6.4 to 7.4 mols of $HNO_3$ per mol of $P_2O_5$ in the phosphate rock depending upon the type of phosphate rock used. Sufficient calcium nitrate in form of calcium nitrate tetrahydrate is crystallized from the acidulated mixture by cooling and separated from the mother liquor by filtration or centrifuging that the mol ratio of CaO to $P_2O_5$ in the mother liquor is at a maximum of 2.3 and preferably ranges between 2.3 and 0.5, this value including about 0.3 mol of CaO in form of compounds which are difficult to acidulate, as for example, $CaF_2$.

Step 2.—The calcium nitrate tetrahydrate separated in step 1 is reacted in known manner with ammonia and carbon dioxide to form ammonium nitrate and calcium carbonate. The resultant ammonium nitrate solution is separated from the calcium carbonate by filtration or centrifuging.

Step 3.—30 to 70% and preferably 35 to 55% of the ammonium nitrate solution obtained in step 2 are added to the mother liquor obtained in step 1. The resultant mixture is neutralized with ammonia in such known manner. During the ammoniation or after the completion thereof, potassium salts are added to the reaction mixture.

Step 4.—The mixture from step 3 is granulated and dried in known manner, this step being preferably carried out with the addition of recycled final product.

The following remarks are made as to the individual operational steps:

The treatment of phosphate rock with nitric acid and the separation of calcium nitrate tetrahydrate in accordance with step 1 are known from the Odda process. It has also been suggested to react the calcium nitrate tetrahydrate obtained in the Odda process with ammonia and carbon dioxide to form ammonium nitrate and calcium carbonate in accordance with step 2. However, there has not been made the proposal up to the present to use the ammonium nitrate thus obtained in further processing the nitric mother liquor to complex fertilizers as is the case in step 3 of the process of the invention.

This is the more remarkable since the Odda process is known to the experts since more than two decades.

The incorporation of potassium salts effected in step 3 in any phase of the ammoniation process is just as well known as the granulation and drying of the mixture obtained in step 3, effected with the addition of recycled final product.

The novel combination, in accordance with the invention, of individual measures which are mostly known results in the following advantages:

In the conventional Odda process, as mentioned in the beginning, it was necessary up to the present to process the total calcium nitrate tetrahydrate to salable single nitrogen fertilizers, viz. to calcium nitrate or chiefly to ammonium nitrate-limestone, i.e., the nitrate nitrogen withdrawn from the process in form of calcium nitrate was not available for the actual production of complex fertilizers. Returning, in form of ammonium nitrate, all or even only part of the nitrate nitrogen contained in the calcium nitrate tetrahydrate into the complex fertilizer production, as is the case in the process of the invention, is not possible in case of the conventional Odda process since, in further processing the nitric mother liquor to complex fertilizers having a balanced or nearly balanced content of $P_2O_5$ and total nitrogen composed of about equal parts of ammonia nitrogen and nitrate nitrogen, already a sufficient amount of nitrate nitrogen is present in the mother liquor to be ammoniated. Therefore, in the conventional Odda process, only about 60% and less of the amount of nitrogen used in form of nitric acid for treating the phosphate rock enter the complex fertilizer. Consequently, a nitric acid plant having a disproportionately great capacity is required for producing the quantity of $N-NO_3$ contained in the complex fertilizers.

The above-mentioned disadvantages are largely avoided by the embodiment I of the process of the invention, wherein about 30 to 70% and preferably 35 to 55% of the amount of nitrate nitrogen contained in the separated calcium nitrate tetrahydrate is again made available in form of ammonium nitrate for the actual production of complex fertilizers. Accordingly, a plant having a capacity of only about 70 to 80% of that required in case of the conventional Odda process is sufficient to produce the amount of nitric acid need for acidulation.

The progress realized from the technical and economical point of view by the embodiment of the process of the invention is illustrated with reference to the appended diagrammatic drawings 1 and 2 in which, by way of example, the production of a complex fertilizer containing 12% N (of which 6% are in form of $N-NH_3$ and 6% in form of $N-NO_3$), 12% $P_2O_5$ and 20% $K_2O$ is taken as a basis. The above-mentioned complex fertilizer is produced, on the one hand, by the conventional Odda process (see FIG. 1) and, on the other hand, by the embodiment I of the process of the invention (see FIG. 2). Both of the diagrams are based on the production of equally large amounts of complex fertilizer having the content of plant food referred to above. Accordingly, equal amounts of $P_2O_5$ in the phosphate rock to be treated are used in the beginning in both cases. The two diagrams permit a comparison to be made between the two modes of operation as to the amounts of nitric acid nitrogen ($N-NO_3$) used in the acidulation and as to the amounts and types of compounds in which the nitric acid nitrogen is present in the individual operational steps.

In the conventional Odda process, as may be seen from FIG. 1, 129.6 tons of $N-NO_3$ are applied to 145 tons of $P_2O_5$ contained in the phosphate rock charged (mol ratio of CaO to $P_2O_5=3.9$), which corresponds to a ratio of 9.1 mols $HNO_3$ to 1 mol $P_2O_5$. From the acidulated mixture, 57.1 tons=44% of the quantity applied of $N-NO_3$ are separated in form of calcium nitrate tetrahydrate so that 72.5 tons=56% of the quantity applied of $N-NO_3$ are available for the complex fertilizer to be produced. The separated calcium nitrate tetrahydrate must necessarily be processed to salable calcium nitrate or ammonium nitrate-limestone, which results in the disadvantages mentioned in the beginning.

As may be seen from FIG. 2, in case of the embodiment I of the process of the invention, only 100 tons of $N-NO_3$ are required for treating the phosphate rock. This corresponds to a ratio of 7 mols $HNO_3$:1 mol $P_2O_5$. Thus, only about 77% of the amount of $N-NO_3$ required in case of the conventional Odda process are used for acidulation. The amount of $N-NO_3$ separated in form of calcium nitrate tetrahydrate amounts to 57.1 tons, i.e., it is equal to that separated in the conventional Odda process (see FIG. 1). However, 29.1 tons=52.0% $N-NO_3$ of the amount of $N-NO_3$ contained in the calcium nitrate tetrahydrate are returned into the mother liquor in form of an ammonium nitrate solution after reaction of a corresponding partial amount of calcium nitrate tetrahydrate with ammonia and carbon dioxide. Thus, a total of 72.5% of the amount of $N-NO_3$ charged are available for the complex fertilizer to be produced as compared with only 56% in case of the conventional Odda process (see FIG. 1). In case of the embodiment I of the process of the invention, that portion of the $N-NO_3$ charged which is transferred to the above-mentioned single nitrogen fertilizers is only 27.5% as compared with 44% in the conventional Odda process.

The diagrammatic drawings may, of course, also be based on the production of complex fertilizers having a content other than 12% N, 12% $P_2O_5$, and 20% $K_2O$. In any case, the technical and economical progress realized by the process of the invention will be clearly obvious.

*Example 1*

860 parts by weight of Morocco phosphate (33% $P_2O_5$) are treated with 1650 parts by weight of nitric acid (54%). From the acidulated mixture, 960 parts by weight of calcium nitrate tetrahydrate are crystallized by cooling. The crystals are separated from the mother liquor by centrifuging and washed with part or all of the nitric acid required for acidulation in a subsequent operation.

Of the washed calcium nitrate tetrahydrate, 505 parts by weight=about 53% of the total amount are reacted in as such known manner with ammonia and carbon dioxide. After separation and washing of the calcium carbonate, there are obtained 527 parts by weight of an about 65% ammonium nitrate solution which is added to the mother liquor obtained after separation of the calcium nitrate tetrahydrate. The resultant mixture is neutralized in known manner with 122 parts by weight of gaseous ammonia with the simultaneous introduction of air and with simultaneous evaporation of water. After the addition of 816 parts by weight of potassium chloride (58% $K_2O$) to the ammoniation mixture, the mass is granulated and dried in known manner while adding about 3.5 times its quantity of recycled final product.

A granulated complex fertilizer which is stable in storage and contains about 14% N, 12% $P_2O_5$, and 20% $K_2O$ is obtained. Of the total amount of $P_2O_5$, 98.8% are soluble in ammonium citrate and 15.8% are soluble in water.

*Example II*

The same process is applied as described in Example I except that the potassium chloride is added to the mixture consisting of mother liquor and ammonium nitrate solution while neutralizing said mixture with ammonia.

A further embodiment of the process of the invention, which, for simplicity, is hereinafter referred to as embodiment II comprises the following operational steps:

*Steps 1 and 2*, i.e., the treatment of the phosphate rock and the reaction of the separated calcium nitrate tetrahydrate with ammonia and carbon dioxide, are the same as in embodiment I of the process of the invention.

*Step 3*.—Sufficient nitric acid together with water is distilled off from the resultant mother liquor that the quantity of N—$NO_3$ distilled off is about 50–75% and preferably 60–70% of total N—$NO_3$ contained in the mother liquor. The nitric acid distilled off, after concentration, is returned into step 1 for treating new amounts of phosphate rock.

*Step 4*.—The total amount of ammonium nitrate solution obtained in step 2 is admixed to the acid residue from distillation obtained in step 3 and containing calcium phosphate. The resultant mixture is neutralized with ammonia in as such known manner while potassium salts are incorporated in the reaction mixture during the ammoniation or upon completion thereof.

*Step 5*.—The ammoniation mixture obtained in step 4 is granulated and dried in known manner, preferably with the addition of recycled final product.

The following remarks are made regarding the individual operational steps:

To steps 1 and 2, the same applies as was said with respect to steps 1 and 2 in the embodiment I of the process of the invention.

The measure of distilling off nitric acid from the Odda mother liquor as effected in step 3 is known per se. The distillation is effected at normal pressure but preferably under vacuum to avoid undesirable side reactions by the lower distillation temperature thus obtained. The measure of distilling off the nitric acid is advantageously combined in known manner with a concentration of the dilute nitric acid driven off. Thus, for example, a 50 to 60% nitric acid may be recovered in one or several subsequent fractionating columns. This acid is returned into step 1 of the process of the invention for treating new amounts of phosphate rock.

The concentration of the dilute nitric acid driven off may also be effected by passing the distillate directly to the tower system of a nitric acid plant. However, it is not necessary in this case to enlarge the already existing tower system since the nitrogen introduced into the tower system with the above-mentioned dilute nitric acid or the above-mentioned distillate is almost completely present as $HNO_3$, i.e., in a pentavalent form, and only the nitric oxides which are in any case introduced into the tower system from the ammonia combustion unit need be oxidized.

To avoid corrosions in the tower system, it is essential for the distillate to be as free from hydrogen fluoride as is possible. Since a distillate containing hydrogen fluoride is especially obtained if phosphate rock poor in silicic acid is used for acidulation, it is advantageous in such cases to add to the mother liquor, prior to distillation, a sufficient amount of reactive silicic acid or of silicates capable of being decomposed with acid. The result is that almost all of the fluorine contained in the distillate is present as fluosilicic acid which is stable in the acid medium of the tower system and is not corrosive.

The reaction of the calcium nitrate tetrahydrate obtained in the Odda process with ammonia and carbon dioxide to form an about 50 to 70% ammonium nitrate solution and calcium carbonate is known as was already pointed out in describing the embodiment I of the process of the invention. However, it was not suggested so far to use the ammonium-nitrate solution thus obtained in further processing to complex fertilizers the residue obtained by distillating the Odda mother liquor (see step 3).

The neutralization of the calcium phosphate-containing residue from the distillation of step 3 may be effected by first mixing it with the ammonium nitrate solution from step 2 and treating the resultant mixture with ammonia in known manner. Another possibility is to add the ammonia to said ammonium nitrate solution and to use the resultant N-solution for ammoniating the distillation residue from step 3. The heat of neutralization evolved in the ammoniation is utilized for evaporating water from the ammoniation mixture.

The further processing of the ammoniated slurry to produce complex fertilizers is effected in the same manner as described in embodiment I of the process of the invention.

The embodiment II of the process of the invention differs as follows from the embodiment I, especially regarding the new technical effects thereby obtained:

As was explained above, in case of the embodiment I of the process of the invention, about 30 to 70% and preferably 35 to 55% of the amount of nitrate nitrogen contained in the separated calcium nitrate tetrahydrate can be made available in form of ammonium nitrate for the actual production of the complex fertilizers while, in case of the conventional Odda process, the amount of nitrate nitrogen contained in the calcium nitrate tetrahydrate obtained is no longer available for the complex fertilizers. Accordingly, a plant having a capacity of only about 70 to 80% of that required in case of the conventional Odda process is sufficient for producing the amount of nitric acid required for acidulation in connection with embodiment I.

The embodiment II of the process of the invention permits practically the total amount of nitrate nitrogen contained in the separated calcium nitrate tetrahydrate to be made available in form of ammonium nitrate for the actual production of the complex fertilizers. The production of single nitrogen fertilizers is practically completely avoided. Moreover, the total amount of nitric acid distilled off from the mother liquor (step 3) is reused in treating new quantities of phosphate rock (i.e., about 25–35% of the total quantity of acid used for acidulation). Accordingly, a nitric acid plant the capacity of which needs be only 50 to 60% of that required so far in case of the conventional Odda process is required in connection with the embodiment II of the process of the invention, provided that equal amounts of complex fertilizers having the same composition are produced in both cases.

A still further advantage over the conventional Odda process is obtained in case of the embodiment II of the process of the invention as regards the granulation and drying operation. In case of the conventional Odda process, the water content of the mixtures charged to the granulating unit is about 18 to 22% while, in the present case, the corresponding water content is only about 8 to 12%. This difference is due to the fact that, in the present case, about two thirds of the water introduced by the nitric acid are already evaporated in distilling off the nitric acid from the mother liquor (step 3). Consequently, the granulation and drying equipment is loaded with a substantially lower amount of water than is the case in the conventional Odda process. Thereby, the advantage is obtained in case of the embodiment II of the process of the invention that the addition of 1.5 to 2.5 times the quantity of recycled final product is sufficient to be able of granulating and drying the mixtures without any difficulty while the conventional Odda process requires about the fourfold to fivefold quantity of recycled final product. Consequently, a correspondingly larger amount of material must constantly be recirculated in case of the conventional Odda process. Accordingly, equipment having a larger capacity has to be used resulting in substantially increased investment and operating costs.

In case of the embodiment II of the process of the invention, alkali silicofluoride, particularly sodium silicofluoride, may be produced as a by-product if desired. For this purpose, the solid impurities generally left in the mother liquor after the separation of the calcium nitrate tetrahydrate is first removed in a suitable manner. The purified mother liquor, prior to distillation, is mixed with a sufficient amount of soluble alkali salt, particularly sodium carbonate or sodium nitrate, that the fluorine contained in the mother liquor is precipitated as completely as is possible as alkali silicofluoride, particularly as sodium silicofluoride. The precipitate is separated, washed and dried. This mode of operation has the further advantage that the foaming otherwise occurring in distilling the mother liquor is largely reduced and a practically fluorine-free distillate is obtained.

The progress realized from the technical and economical point of view by the embodiment II of the process of the invention is illustrated with reference to the appended diagrammatic drawing 3 by comparing the embodiment II of the process of the invention with the conventional Odda process (see FIG. 1). Both of the drawings are based on the production of equal amounts of complex fertilizer having the commercial content of 12% N (of which 6% are in form of $N-NH_3$ and 6% in form of $N-NO_3$), 12% $P_2O_5$, and 20% $K_2O$. Accordingly, equally large amounts of $P_2O_5$ in the phosphate rock applied (Morocco phosphate, $CaO/P_2O_5$=about 3.9) are used in the beginning in both cases. The two diagrams 1 and 3 permit the two modes of operation shown to be compared as to the amounts of nitric acid nitrogen ($N-NO_3$) required in each case for acidulation and as to the amounts or type of compounds in which the nitric acid nitrogen ($N-NO_3$) is present in the individual operational steps.

FIG. 1 has already been explained in describing the embodiment I of the process of the invention. As may be seen from FIG. 3, the embodiment II of the process of the invention advantageously differs from the conventional Odda process by the fact that, in case of the embodiment II of the process, only 100 tons of $N-NO_3$ are required for phosphate rock treatment. A still further fact to be drawn into consideration is that of the 100 tons of $N-NO_3$ applied about 27.5 tons are derived from the nitric acid recycle within the range of the operational steps 1 and 3 and about 72.5 tons are derived from nitric acid newly introduced into the process as compared with 129.6 tons of freshly introduced nitric acid in case of the conventional Odda process. The capacity of the nitric acid plant therefore needs be only 56% of that required in case of the conventional Odda process, based on about the same quantity of complex fertilizer produced. The embodiment II of the process of the invention has the further advantage that single nitrogen fertilizers are not produced in addition to the complex fertilizer because the total amount of $N-NO_3$ contained in the calcium nitrate tetrahydrate, after reaction of the same with ammonia and carbon dioxide, is passed in form of ammonium nitrate to the residue obtained in distilling the mother liquor. Thus, the total amount of 72.5 tons of $N-NO_3$ freshly produced is introduced into the complex fertilizer in case of the embodiment II of the process of the invention.

*Example III*

850 parts by weight of pebble phosphate (33.5% $P_2O_5$) are treated with 1636 parts by weight of nitric acid (54%). From the acidulate, 960 parts by weight of calcium nitrate tetrahydrate are crystallized by cooling and separated from the mother liquor by filtration. The slurry left in the mother liquor is subsequently separated and the purified mother liquor is mixed with 26 parts by weight of soda ash. The precipitated sodium silicofluoride is filtered off, washed and dried. The mother liquor which has thus been made largely free from fluorine is distilled under a reduced pressure. The resultant distillate consisting of 672 parts by weight of nitric acid (37.5%) is passed to the tower system of a nitric acid production plant.

The remaining molten residue from the distillation (840 parts by weight with about 6% $H_2O$) is mixed with 914 parts by weight of a 70% ammonium nitrate solution obtained by reacting the separated calcium nitrate tetrahydrate with ammonia and carbon dioxide and separating the precipitated calcium carbonate from the reaction solution. The resultant fluid mixture is ammoniated with 35 parts by weight of gaseous ammonia. The final ammoniation mixture is mixed with 816 parts by weight of potassium chloride (58% $K_2O$) and the resultant slurry is granulated in known manner with the addition of recycled final product in amount of about twofold its weight and dried.

A complex fertilizer containing about 12% N (of which about 6% are in the form of $N-NH_3$ and 6% in form of $N-NO_3$), 12% $P_2O_5$ and 20% $K_2O$ is obtained. Of the total amount of $P_2O_5$, about 98.9% are soluble in ammonium citrate and 12.2% are soluble in water.

*Example IV*

The same process is applied as described in Example III except that the potassium chloride is added as early as during the ammoniation of the mixture obtained by combining the residue from the distillation and the ammonium nitrate solution.

*Example V*

860 parts by weight of Morocco phosphate (33.0% $P_2O_5$) are treated with 1650 parts by weight of nitric acid (54%). From the acidulated mixture, 1040 parts by weight of calcium nitrate tetrahydrate are crystallized by cooling and separated therefrom. The resultant mother liquor is distilled under vacuum after the addition of about 10 parts by weight of reactive silicic acid. Thereby, 580 parts by weight of nitric acid (about 35%) are driven off. In a subsequent fractionating column, the 35% nitric acid distilled off is concentrated to form 54% acid. This acid, together with 53% nitric acid from the nitric acid plant, is used for treating new quantities of phosphate rock.

The molten residue left in the distillation of the mother liquor (890 parts by weight with about 8% of water) is mixed with 830 parts by weight of ammonium nitrate solution (85%) obtained by reacting the separated calcium nitrate tetrahydrate with ammonia and carbon dioxide, separating the precipitated calcium carbonate and concentrating the filtrate. The fluid mixture is neutralized with 68 parts by weight of ammonia while simultaneously evaporating water. The final ammoniation mixture is mixed with 816 parts by weight of potassium chloride (58% $K_2O$) and granulated in known manner with the addition of about the same amount of recycled final product and dried.

There is obtained a complex fertilizer containing about 14% N (of which about 7.3% are in form of N—$NH_3$ and 6.7% in form of N—$NO_3$), 12% $P_2O_5$, and 20% $K_2O$. Of the total amount of $P_2O_5$, 98.0% are soluble in ammonium citrate and 25.0% are soluble in water.

A further embodiment of the process of the invention which, for simplicity, is hereinafter referred to as embodiment III comprises the following operational steps:

Step 1 is carried out in the same manner as step 1 of embodiment I or II of the process of the invention except that sufficient calcium nitrate tetrahydrate is crystallized from the acidulated mixture and separated from the mother liquor that the mol ratio of CaO to $P_2O_5$ in the mother liquor is not higher than 1.9 and preferably from 1.9 to 0.5, which includes about 0.3 mol of CaO in form of compounds which are difficult to acidulate, as for example, in form of $CaF_2$.

Step 2.—The reaction of the separated calcium nitrate tetrahydrate with ammonia and carbon dioxide is effected in the same manner as in step 2 of the embodiment I or II of the process of the invention.

Step 3.—The mother liquor from step 1 is mixed with sufficient phosphate rock that the quantity of phosphate rock added is about 15 to 40% and preferably 25 to 40% of that reacted in step 1. The freshly added phosphate rock is acidulated with the acid mother liquor with intermixing, said acidulation being first effected at about 40 to 80° C. and preferably 50–70° C. and subsequently at about 130 to 250° C. and preferably at about 140 to 170° C. using a superatmospheric pressure if necessary or desired. Another advantageous manner of effecting the acidulation at a temperature of 130 to 250° C. and preferably of 140 to 170° C. is to pass the acidulated mixture which, if desired, has been preheated, into a spray tower or similar device where it is contacted with hot inert gases in cocurrent or countercurrent flow relation thereby simultaneously atomizing and drying the reaction mixture.

Step 4.—The acidulated mixture from step 3 is mixed with the total amount of ammonium nitrate solution from step 2 and the resultant acid slurry is neutralized with ammonia. During the ammoniation or upon completion thereof, potassium salts are admixed to the reaction mixture.

Step 5.—The ammoniation mixture obtained in step 4 is granulated and dried in known manner, the granulation being effected with the addition of recycled final product if desired.

The following remarks are made regarding the individual operational steps:

As to the procedure itself followed in carrying out steps 1 and 2, the same applies as was said regarding steps 1 and 2 of the embodiment I or II of the process of the invention.

The measure of treating rock phosphate with Odda mother liquor at an elevated temperature (see step 3) is known as such. However, the suggestion has not been made so far to effect the acidulation at an elevated temperature in a spray tower or similar apparatus thereby simultaneously atomizing and drying the acidulation mixture. This results in the additional advantage that the fluorine contained in the mixture being acidulated is largely driven off therefrom in form of volatile fluorine compounds. This effect may be further improved by adding adequate amounts of reactive silicic acid or borax to the mixture being acidulated. In this manner, complex fertilizers which are almost free from fluorine are obtained.

The acidulation of further amounts of phosphate rock with Odda mother liquor may also be effected in one or several series-connected autoclaves with stirrer at a temperature of about 130 to 180° C. and preferably at 140 to 160° C., in which case the overpressure is utilized for blowing off water vapor and volatile fluorine compounds. The driving-off of the fluorine may be aided in the manner described above by adding reactive silicic acid or borax.

The reaction of the calcium nitrate tetrahydrate obtained in the Odda process with ammonia and carbon dioxide to form an about 50 to 70% ammonium nitrate solution and calcium carbonate is known as was already pointed out in describing the embodiment I or II of the process of the invention. However, it was not suggested so far to use the ammonium nitrate solution thus obtained in further processing to complex fertilizers the acidulation products obtained by reacting phosphate rock with Odda mother liquor (see step 3).

The measures of ammoniating acid slurries containing ammonium nitrate with the simultaneous or subsequent addition of potassium salts (step 4) and of further processing mixtures of this kind to complex fertilizers by granulation and drying (step 5) are known as such.

Regarding the technical and economical advantages obtained in case of the embodiment III by the novel combination of partially known and partially unknown measures, the following should be pointed out:

In case of the embodiment III of the process of the invention as in case of the embodiment II, the total amount of nitrate nitrogen contained in the separated calcium nitrate tetrahydrate is made available in form of ammonium nitrate for the complex fertilizers to be produced since, in contrast to the conventional Odda process, nitrogen-carrying single fertilizers are not produced in both embodiments.

In case of the embodiment III, the additional advantage over the embodiment II is obtained that no nitric acid is recycled in contrast to the embodiment II in which the nitric acid recycled accounts for about 25 to 30% of the total amount of nitric acid charged. The recycling of nitric acid mentioned above in case of the embodiment II results from the fact that nitric acid is driven off from the mother liquor as is described more detailed in the embodiment II. In contrast to this, in case of the embodiment III, the total acidity of the mother liquor from step 1 is utilized for acidulating further amounts of phosphate rock.

In case of the embodiment III, similar to the embodiment II, the preliminary evaporation of water from the mother liquor or from the acidulated mixtures obtained with the mother liquor has a favorable effect regarding the subsequent granulation and drying process (step 5). Due to the preliminary evaporation of water as mentioned above, especially in case of using spray towers or similar devices, the percentage water content in the slurries passed to the granulation unit is reduced by one half and more, based on the percentage water content contained in the mixtures passed to the granulation unit in case of the conventional Odda process. As a consequence of the low water content of the mixtures, there results a substantially reduced flow of material to the granulation and drying equipment as well as a substantially reduced amount of circulated material since the quantity of recycled final product may be decreased to 1 time to 1.5 times the amount, based on the quantity of slurry. Under certain circumstances, the addition of recycled final product may be completely eliminated.

The progress realized from the technical and economical point of view by the embodiment III of the process of the invention is hereinafter illustrated with reference to the appended diagrammatic drawing 4 by comparing the embodiment III with the conventional Odda process (see FIG. 1). Both of the diagrams are based on the production of equal amounts of complex fertilizer having the commercial analysis of 12% N (of which 6% are in form of N—NH$_3$ and 6% in form of N—NO$_3$), 12% P$_2$O$_5$, and 20% K$_2$O. Accordingly, equally large amounts of P$_2$O$_5$ in the phosphate rock charged are used in each case. FIGS. 1 and 4 permit the two modes of operation represented to be compared as to the amounts of nitric acid nitrogen (N—NO$_3$) required in each case for acidulation and as to the amounts or type of compounds in which the nitric acid nitrogen is present in the individual operational steps.

FIG. 1 was already explained in describing the embodiment I of the process of the invention. As may be seen from FIG. 4, the embodiment III of the process of the invention differs advantageously from the conventional Odda process in that it requires only 72.5 tons of N—NO$_3$ for the same quantity of P$_2$O$_5$ (145 tons) as compared with 129.6 tons in case of the conventional Odda process. This quantity charged of nitric acid for acidulation which is low as compared with the conventional Odda process (only about 56%) is made possible by the fact that, in step 1, only about 71% of the total amount of phosphate rock is acidulated with nitric acid, while the remaining 29% are acidulated in step 3 with the mother liquor obtained in step 1. Therefore, the capacity of the nitric acid plant required in connection with the embodiment III of the process of the invention needs be only about 56% of that required in connection with the conventional Odda process provided that equal amounts of complex fertilizer having the same analysis are produced in both cases. The further advantage is obtained that, in case of the embodiment III of the process of the invention, nitrogen-carrying single fertilizers are not produced and that the total amount of N—NO$_3$ contained in the calcium nitrate tetrahydrate, after reaction of the same with ammonia and carbon dioxide, is available in form of ammonium nitrate for the complex fertilizers to be produced.

*Example VI*

860 parts by weight of Morocco phosphate (33% P$_2$O$_5$) are treated with 1635 parts by weight of nitric acid (54%). From the acidulate, 1300 parts by weight of calcium nitrate tetrahydrate are crystallized and separated from the mother liquor.

The mother liquor obtained (1195 parts by weight with about 30% of H$_2$O) is mixed with 258 parts by weight of Morocco phosphate (33% P$_2$O$_5$). The reaction mixture is first heated at 60–70° C. while agitating. Thereby, a partial acidulation of the phosphate rock newly added takes place. The acidulation is completed by still further heating the reaction mixture for some time at 110° C.–130° C. under normal pressure.

The resultant acidulated mixture (1250 parts by weight with about 12% of H$_2$O) is mixed with 1360 parts by weight of ammonium nitrate solution (65%) obtained by reacting the separated calcium nitrate tetrahydrate with about equivalent amounts of ammonia and carbon dioxide in known manner.

The ammonium nitrate-containing mixture (2610 parts by weight with about 24% of H$_2$O) is neutralized with about 95 parts by weight of ammonia while simultaneously adding 1080 parts by weight of potassium chloride (60% K$_2$O). The final ammoniation mixture to which an about 3-fold quantity of recycled final product is added is granulated and dried in known manner.

A complex fertilizer containing about 14% N, 12% P$_2$O$_5$, and 21% K$_2$O is obtained. Of the total amount of P$_2$O$_5$, 98.0% are soluble in ammonium citrate and 24.8% are soluble in water.

*Example VII*

The treatment of phosphate rock and the recovery of the mother liquor are effected in the same manner and with the same amounts of materials as in Example VI.

In an autoclave with stirrer, 1195 parts by weight of the mother liquor are mixed with 258 parts by weight of Morocco phosphate (33% P$_2$O$_5$) and acidulated at 130–150° C. and a pressure of 3–5 kg./sq. cm. gauge. In letting down the autoclave pressure, volatile fluorine compounds and sufficient water vapor are blown off that an acidulate containing 8% of H$_2$O is obtained. The acidulated mixture (1193 parts by weight) is mixed with 1360 parts by weight of ammonium nitrate solution obtained by reacting the separated calcium nitrate tetrahydrate with ammonia and carbon dioxide.

The ammonium nitrate-containing mixture is further processed to complex fertilizers in the same manner as described in Example VI.

A complex fertilizer containing about 14% N, 12% P$_2$O$_5$, and 21% K$_2$O is obtained. Of the total amount of P$_2$O$_5$, 98.8% are soluble in ammonium citrate and 25.2% are soluble in water.

*Example VIII*

748 parts by weight of kola phosphate (38%) are treated with 1540 parts by weight of nitric acid (54%). From the acidulate, 1120 parts by weight of calcium nitrate tetrahydrate are crystallized and separated from the mother liquor.

The resultant mother liquor (1168 parts by weight with 31% of H$_2$O) is mixed with 224 parts by weight of kola phosphate (38% P$_2$O$_5$). The resultant mixture is first partially acidulated at 60–70° C. The preheated mixture is subsequently passed to a spray tower where it is passed in countercurrent contact with fuel gases thereby completing the acidulation at a temperature of 130–250° C. At the same time, the acidulated mixture is dried while being sprayed and while driving off volatile fluorine compounds.

The dry acidulate obtained (1035 parts by weight with about 1% H$_2$O) is mixed with 1160 parts by weight of ammonium nitrate solution (65%) obtained by reacting the separated calcium nitrate tetrahydrate in known manner with ammonia and carbon dioxide. The resultant mixture (2195 parts by weight with about 19% of H$_2$O) is neutralized with 122 parts by weight of ammonia and mixed with 1080 parts by weight of potassium chloride (60% K$_2$O) during the ammoniation. The resultant mixture to which about the same amount of recycled final product is added is granulated and dried in known manner.

A complex fertilizer containing 13.9% N, 12.3% P$_2$O$_5$, and 21.5% K$_2$O is obtained. Of the total amount of P$_2$O$_5$, 99.3% are soluble in ammonium citrate and 39.5% are soluble in water.

*Example IX*

272 parts by weight of kola phosphate (38% P$_2$O$_5$) are treated with 604 parts by weight of nitric acid (54%). From the acidulate, 265 parts by weight of calcium nitrate tetrahydrate are crystallized and separated from the mother liquor.

The resultant mother liquor (425 parts by weight with 31% of H$_2$O) is mixed with 109 parts by weight of kola phosphate (38% P$_2$O$_5$). The resultant mixture is first partially acidulated at 50–75° C. while stirring. The preheated mixture is subsequently led to a spray tower where it is passed in cocurrent contact with fuel gases thereby completing the acidulation at a temperature of 140 to 240° C. while simultaneously atomizing and drying the mass.

The acidulate (containing about 2.5% of H$_2$O) is mixed with 276 parts by weight of ammonium nitrate solution (about 65%) obtained by reacting the separated calcium nitrate tetrahydrate in known manner with ammonia and carbon dioxide. The resultant mixture is neutralized with 50 parts by weight of ammonia and mixed with 403 parts by weight of potassium chloride (60% K$_2$O).

The resulting slurry to which about 1.5 times its quantity of recycled final material is added is granulated and dried in known manner.

A complex fertilizer containing about 12% N (of which 6% are in form of N—NH$_3$ and 6% in form of N—NO$_3$), 12% $P_2O_5$, and 21% $K_2O$ is obtained. Of the total amount of $P_2O_5$, 98.8% are soluble in ammonium citrate and 12.0% are soluble in water.

It was found that the calcium carbonate obtained by reacting the calcium nitrate tetrahydrate with ammonia and carbon dioxide (see step 2) has proved to be a valuable filler.

Since different embodiments of the invention could be made without departing from the scope of the invention, it is intended that all matter contained in the above description or shown in the accompanying drawing shall be interpreted as illustrative and not in a limiting sense.

What we claim is:

1. A process for preparing complex fertilizers containing dicalcium phosphate, ammonium phosphate, ammonium nitrate, and potassium nitrate in such proportion that the content by weight of nitrogen present in the form of nitrate and in ammoniated form in said fertilizer is about equal to that of $P_2O_5$ present and the content by weight of $K_2O$ present is 1.0 to 3.5 times that of $P_2O_5$, said $P_2O_5$ being present in the form of phosphate completely soluble in ammonium citrate and partially soluble in water, which comprises the following steps:

Step I: Treating phosphate rock with nitric acid having a concentration of from 50 to 60% $HNO_3$ in the proportions of from about 6.4 to about 7.4 mols of $HNO_3$ per mol of $P_2O_5$ in the phosphate rock, crystallizing calcium nitrate tetrahydrate by cooling the acidulated mixture and separating said calcium nitrate tetrahydrate from the mother liquor so that the mol ratio of CaO to $P_2O_5$ present in the mother liquor is less than about 2.3;

Step II: Reacting the calcium nitrate tetrahydrate from step I with equivalents of ammonia and carbon dioxide and separating the resultant ammonium nitrate solution from the precipitated calcium carbonate;

Step III: Adding from about 30 to 70% by weight of the separated ammonium nitrate solution from step II to the mother liquor from step I, neutralizing the resultant mixture with ammonia and incorporating in said mixture per mol of $P_2O_5$ present from 1.0 to 3.5 mols of $K_2O$ in the form of a potassium salt;

Step IV: Mixing one part by weight of the material obtained from step III with at least one part by weight of recycled and already dried final product of small particle size, and granulating and drying the resultant mixture.

2. A process according to claim 1 wherein the amount of recycled final product used in step IV is from 1.0 to 3.5 parts by weight per part by weight of the material from step III.

3. A process according to claim 1 wherein the potassium salt is incorporated in the ammoniated material in step III prior to the completion of the ammoniation of said material.

4. A process according to claim 1 wherein the nitric acid used in treating the phosphate rock in step I is used in the proportions of from 6.6 to 7.2 mols of $HNO_3$ per mol of $P_2O_5$ present in the phosphate rock, so that upon separating the calcium nitrate tetrahydrate from the mother liquor, the mol ratio of CaO to $P_2O_5$ present in said mother liquor is within the range of from 2.3 to 0.5; and wherein in step III about 35 to 55% by weight of ammonium nitrate solution from step II is added to the mother liquor from step I, the $K_2O$ being in the form of potassium chloride, said $K_2O$ being incorporated in the mixture in step III in an amount of from 1.0 to 2.5 mols $K_2O$ per mol of $P_2O_5$ present; and wherein in step IV three parts of recycled final product is used per part by weight of the material from step III.

5. A process for preparing complex fertilizers containing dicalcium phosphate, ammonium phosphate, ammonium nitrate, and potassium nitrate in such proportion that the content by weight of nitrogen present in the form of nitrate and in ammoniated form in said fertilizer is about equal to that of $P_2O_5$ present and the content by weight of $K_2O$ present is 1.0 to 3.5 times that of $P_2O_5$, said $P_2O_5$ being present in the form of phosphates completely soluble in ammonium citrate and partially soluble in water, which comprises the following steps:

Step I: Treating phosphate rock with nitric acid having a concentration of from 50 to 60% $HNO_3$ in the proportions from about 6.4 to 7.4 mols of $HNO_3$ per mol of $P_2O_5$ present in the phosphate rock, crystallizing calcium nitrate tetrahydrate by cooling the acidulated mixture and separating said calcium nitrate tetrahydrate from the mother liquor so that the mol ratio of CaO to $P_2O_5$ present in the mother liquor is less than 2.3;

Step II: Reacting the calcium nitrate tetrahydrate from step I with equivalents of ammonia and carbon dioxide and separating the resultant ammonium nitrate solution from the precipitated calcium carbonate;

Step III: Distilling from about 50 to 75% by weight of the nitric acid from the mother liquor of step I, concentrating the resultant diluted nitric acid and using the resultant concentrated nitric acid in step I for the acidulation of rock phosphate;

Step IV: Adding the whole amount of the ammonium nitrate solution from step II to the residue from the distillation according to step III, neutralizing the resultant mixture with ammonia and incorporating in said mixture from about 1.0 to 3.5 mols $K_2O$ in the form of a potassium salt per mol of $P_2O_5$ present; and Step V: Mixing one part by weight of the material from step IV with from 1.0 to 3.5 parts by weight of recycled and already dried final product of small particle size, and granulating and drying the resultant mixture.

6. A process according to claim 5 wherein the potassium salt is incorporated in the ammoniated material prior to completion of the ammoniation of said material.

7. A process according to claim 5 wherein the nitric acid used for treating the phosphate rock in Step I is present in the proportion of from 6.6 to 7.2 mols of $HNO_3$ per mol of $P_2O_5$ present in the phosphate rock, whereby upon separating the calcium nitrate tetrahydrate from the mother liquor, the mol ratio of CaO to $P_2O_5$ present in the mother liquor is within the range of from 2.3 to 0.5; wherein the distillation in step III is carried out under reduced pressure and 60 to 70% by weight of the nitric acid is distilled from the mother liquor from step I, said distillate being introduced in a tower system of a nitric acid plant; wherein the $K_2O$ in the form of a potassium salt is incorporated in the mixture in step IV in an amount of from 1.0 to 2.5 mols of $K_2O$ per mol of $P_2O_5$ present; and wherein about one part by weight of recycled and already dried final product is used in step V per part by weight of the material from step IV.

8. A process for preparing complex fertilizers containing dicalcium phosphate, ammonium phosphate, ammonium nitrate, and potassium nitrate in such proportion that the content by weight of nitrogen present in the form of nitrate and in ammoniated form in said fertilizer is about equal to that of $P_2O_5$ present and the content by weight of $K_2O$ present is 1.0 to 3.5 times that of $P_2O_5$, said $P_2O_5$ being present in the form of phosphates completely soluble in ammonium citrate and partially soluble in water which comprises the following steps:

Step I: Treating phosphate rock with nitric acid having a concentration of from 50 to 60% $HNO_3$ in the proportion of from about 6.4 to 7.4 mols of $HNO_3$ per mol of $P_2O_5$ present in the phosphate rock, crystallizing calcium nitrate tetrahydrate by cooling the acidulated mixture and separating said calcium nitrate tetrahydrate from the mother liquor so that the mol ratio of CaO to $P_2O_5$ present in the mother liquor is less than 1.9;

Step II: Reacting the calcium nitrate tetrahydrate from step I with equivalents of ammonia and carbon dioxide and separating the ammonium nitrate solution from the precipitated calcium carbonate;

Step III: Adding phosphate rock in an amount corresponding to from 15 to 40% by weight of the amount of phosphate rock employed in step I to the mother liquor from step I, heating the resultant mixture in a first stage at a temperature from 40 to 80 degrees C. and in a second stage at a temperature of from 130 to 200 degrees C.;

Step IV: Mixing the resultant mass from step III with the whole amount of the ammonium nitrate solution from step II, neutralizing the resultant mixture with ammonia and incorporating $K_2O$ in the form of a potassium salt in said mixture in an amount of from 1.0 to 3.5 mols of $K_2O$ per mol of $P_2O_5$ present;

Step V: Mixing from about 1.0 to 2.5 parts by weight of recycled and already dried final product of small particle size per part by weight of the material from step IV, granulating and drying the resultant mixture.

9. A process according to claim 8 wherein the potassium salt is incorporated in the ammoniated material prior to completion of the ammoniation of said material.

10. A process according to claim 8 wherein the nitric acid used for treating the phosphate rock in step I is used in the proportion of from about 6.6 to 7.2 mols of $HNO_3$ per mol of $P_2O_5$ present in the phosphate rock, and wherein upon separation of the calcium nitrate tetrahydrate from the mother liquor the mol ratio of CaO to $P_2O_5$ present in the mother liquor is within the range of from 1.0 to 0.3; wherein the amount of phosphate rock added in step III is from 25 to 40% by weight of the amount of phosphate rock employed in step I and wherein the resultant mixture is heated in a single stage at a temperature of from 130 to 180 degrees C. under a pressure of from 3 to 5 kilograms per square centimeter gauge; and wherein from 1.0 to 3.5 parts by weight of recycled and already dried final product are used in step V per part by weight of the material from step IV which is mixed therewith.

11. A process for preparing complex fertilizers containing dicalcium phosphate, ammonium phosphate, ammonium nitrate, and potassium nitrate in such proportion that the content by weight of nitrogen present in the form of nitrate and in ammoniated form in said fertilizer is about equal to that of $P_2O_5$ present, and the content by weight of $K_2O$ present is 1.0 to 3.5 times that of $P_2O_5$, said $P_2O_5$ being present in the form of phosphates completely soluble in ammonium citrate and partially soluble in water, which comprises the following steps:

Step I: Treating phosphate rock with nitric acid having a concentration of from 45 to 60% $HNO_3$ in the proportion of from about 6.6 to 7.2 mols of $HNO_3$ per mol of $P_2O_5$ present in the phosphate rock, crystallizing calcium nitrate tetrahydrate by cooling the acidulated mixture and separating said calcium nitrate tetrahydrate from the mother liquor so that the mol ratio of CaO to $P_2O_5$ present in the mother liquor is within the range of from 1.9 to 0.3;

Step II: Reacting the calcium nitrate tetrahydrate from step I with equivalents of ammonia and carbon dioxide and separating the ammonium nitrate solution from the precipitated calcium carbonate;

Step III: Adding phosphate rock in an amount corresponding to from 25 to 40% by weight of the amount of phosphate rock employed in step I to the mother liquor from step I, heating the resultant mixture in a single stage at a temperature from 130 to 250° C. by spraying the mixture in a current of hot gases in a spray dryer;

Step IV: Mixing the resultant mass from step III with the whole amount of the ammonium nitrate solution from step II, neutralizing the resultant mixture with ammonia and incorporating $K_2O$ in the form of a potassium salt in said mixture in an amount of from 1.0 to 3.5 mols of $K_2O$ per mol of $P_2O_5$ present;

Step V: Mixing from about 1.0 to 3.5 parts by weight of recycled and already dried final product of small particle size per part by weight of the material from step IV, granulating and drying the resultant mixture.

12. A process according to claim 11 in which the mixture of phosphate rock and mother liquor in step III is heated at a temperature of from 40 to 80 degrees C. prior to heating in the spray dryer.

References Cited in the file of this patent

UNITED STATES PATENTS

| | | |
|---|---|---|
| 1,826,785 | Holz | Oct. 13, 1931 |
| 1,856,187 | Johnson | May 3, 1932 |
| 2,803,531 | Swensen et al. | Aug. 20, 1957 |
| 2,899,293 | Munekata | Aug. 11, 1959 |

FOREIGN PATENTS

| | | |
|---|---|---|
| 339,500 | Great Britain | Dec. 11, 1930 |
| 339,969 | Great Britain | Dec. 16, 1930 |